United States Patent
Stec

(10) Patent No.: US 9,934,559 B2
(45) Date of Patent: Apr. 3, 2018

(54) METHOD FOR CORRECTING AN ACQUIRED IMAGE

(71) Applicant: FotoNation Limited, Galway (IE)

(72) Inventor: Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 58 days.

(21) Appl. No.: 15/048,224

(22) Filed: Feb. 19, 2016

(65) Prior Publication Data

US 2017/0243330 A1    Aug. 24, 2017

(51) Int. Cl.
*G06K 9/00* (2006.01)
*G06T 5/00* (2006.01)
*G06T 7/20* (2017.01)
*H04N 5/232* (2006.01)

(52) U.S. Cl.
CPC ............... *G06T 5/003* (2013.01); *G06T 7/20* (2013.01); *H04N 5/23254* (2013.01); *H04N 5/23267* (2013.01); *G06T 2207/20201* (2013.01)

(58) Field of Classification Search
CPC ...... G03B 2217/005; G03B 2205/0007; G03B 2207/005; G06T 7/20; G06K 9/00771; H04N 5/23248; H04N 3/1562; H04N 5/2329; H04N 5/23254; H04N 5/23251; H04N 5/23258; H04N 5/23264; G02B 27/646
USPC ....... 348/208.99, 208.1, 208.2, 208.4, 208.5, 348/208.6, 296, 208.12, 208.13; 386/224; 382/254, 255, 275; 396/7, 52, 53, 55; 359/554
See application file for complete search history.

(56) References Cited

U.S. PATENT DOCUMENTS

| | | | |
|---|---|---|---|
| 9,743,001 B1* | 8/2017 | Stec .................. | H04N 5/2329 |
| 2006/0140503 A1* | 6/2006 | Kurata ............... | H04N 5/3572 |
| | | | 382/275 |
| 2008/0166115 A1* | 7/2008 | Sachs ................. | G03B 17/00 |
| | | | 396/55 |
| 2013/0044230 A1* | 2/2013 | Zhou .................. | H04N 5/2329 |
| | | | 348/208.6 |

(Continued)

FOREIGN PATENT DOCUMENTS

WO    WO2014005783    1/2014

OTHER PUBLICATIONS

Karpenko, Alexandre, et al. "Digital video stabilization and rolling shutter correction using gyroscopes." CSTR 1 (2011): 2.*

(Continued)

*Primary Examiner* — Aaron W Carter

(57) ABSTRACT

A method of correcting an image obtained by an image acquisition device includes obtaining successive measurements, $G_n$, of device movement during exposure of each row of an image. An integration range, idx, is selected in proportion to an exposure time, $t_e$, for each row of the image. Accumulated measurements, $C_n$, of device movement for each row of an image are averaged across the integration range to provide successive filtered measurements, $\overline{G}$, of device movement during exposure of each row of an image. The image is corrected for device movement using the filtered measurements $\overline{G}$.

6 Claims, 2 Drawing Sheets

(56) References Cited

U.S. PATENT DOCUMENTS

| | | | | |
|---|---|---|---|---|
| 2013/0044241 A1* | 2/2013 | Zhou | .................. | H04N 5/23258 |
| | | | | 348/241 |
| 2013/0329064 A1* | 12/2013 | Price | .................... | H04N 19/132 |
| | | | | 348/208.6 |
| 2015/0341576 A1* | 11/2015 | Gu | ....................... | H04N 5/2329 |
| | | | | 348/222.1 |
| 2016/0006935 A1* | 1/2016 | Zhou | .................. | H04N 5/23254 |
| | | | | 348/208.1 |
| 2016/0105648 A1* | 4/2016 | Eline | .................... | B64C 39/024 |
| | | | | 348/144 |
| 2016/0360111 A1* | 12/2016 | Thivent | .............. | H04N 5/23287 |
| 2017/0244881 A1* | 8/2017 | Stec | ..................... | H04N 5/2329 |

OTHER PUBLICATIONS

Hee Park, Sung, and Marc Levoy. "Gyro-based multi-image deconvolution for removing handshake blur." Proceedings of the IEEE Conference on Computer Vision and Pattern Recognition. 2014.*

Hanning, Gustav, et al. "Stabilizing cell phone video using inertial measurement sensors." Computer Vision Workshops (ICCV Workshops), 2011 IEEE International Conference on. IEEE, 2011.*

* cited by examiner

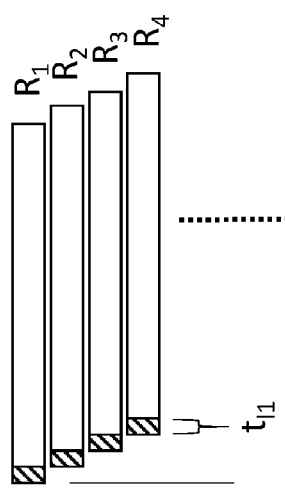
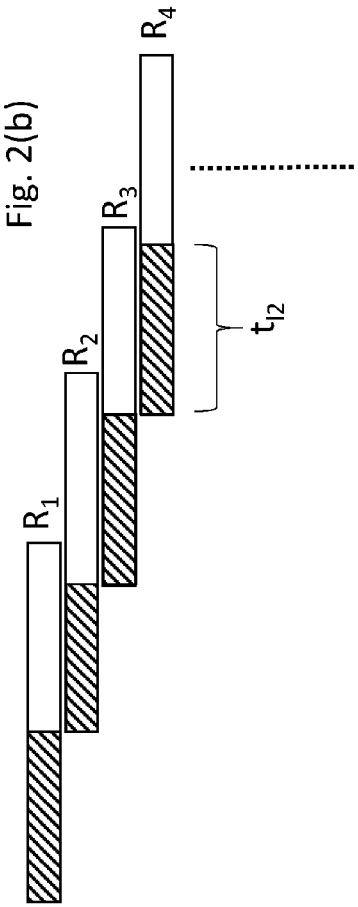
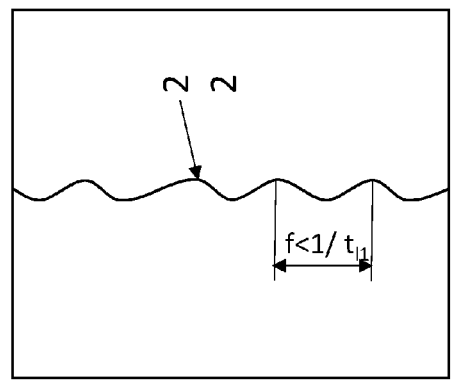
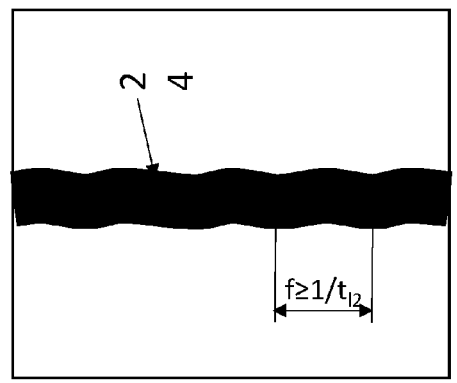

METHOD FOR CORRECTING AN ACQUIRED IMAGE

RELATED APPLICATION

The present application relates to co-filed application Ser. No. 15/048,149 entitled "A Method of Stabilizing a Sequence of Images", filed Feb. 19, 2016, the disclosure of which is incorporated herein by reference.

FIELD OF THE INVENTION

The present invention relates to a method for correcting an acquired image.

BACKGROUND

Referring to FIG. 1, image acquisition devices 10 typically comprise an image processing pipeline (IPP) 12 which obtains acquired image data from an image sensor (not shown), conducts basic processing of the raw image data, such as color balancing, and writes acquired images or portions of images via a system bus 20 to system memory 14. Image frames can be acquired by the IPP 12 at frame rates from 24 fps up to from 60 fps to even 240 fps.

Such image acquisition devices 10 can include downstream dedicated image processing units which can analyse acquired images and process such images either to extract information from the images or to correct the images. Such processing can includes face detection and tracking, object recognition or distortion correction such as disclosed in PCT Application WO2014/005783 (Ref: FN-384). In the present specification, such processing units, which can be dedicated hardware modules or a generic central processing unit (CPU), are indicated as processing unit (PU) 16 which is capable of running either low-level firmware/software or in the case of the CPU, application software, capable of obtaining image information from memory 14 and further processing the images.

In the present specification, we refer to images being provided by IPP 12, however, it will be appreciated that these can comprise either individually acquired images or images within a video sequence.

It is known for image acquisition devices 10 to include inertial measurement units (IMU) 18 which record a trajectory of device movement during image acquisition, enabling processing unit(s) 16 to use that information to correct an acquired image to take into account blur caused by involuntary or unwanted device motion during image capture or to stabilize video sequences, for example, as disclosed in Sung Hee & Park Marc Levoy "Gyro-Based Multi-Image Deconvolution for Removing Handshake Blur", pp 3366-3373, Conference on Computer Vision and Pattern Recognition, 23-28 Jun. 2014. IMUs 18 can include any combination of gyroscopes, accelerometers and magnetometers. Typically involuntary or unwanted device motion blur is caused by human hand shake or tremor as distinct from a deliberate sweeping movement used by photographers or videographers when attempting either to simulate motion blur or to capture an image of a moving object.

Referring to FIG. 2(a), some image acquisition devices employ a rolling shutter technique where one or more lines (rows) of an image are read from an image sensor during successive exposure intervals. Each line or group of lines $R_1, R_2, R_3, R_4 \ldots$ of the image sensor is exposed over certain period of time $t_{f1}$, meaning the light intensity is integrated over that period of time. If the acquisition device is moved during the exposure time, the total line exposure is a sum of light coming from different directions. If an image acquisition device is subjected to relatively high frequency vibrational movement during image acquisition using rolling shutter, i.e. a frequency (f) higher than the total exposure time for the image frame $t_f$, then a vertical straight edge within a scene can appear to oscillate as indicated by the line 22.

Let us first assume a perfect synchronization between IMU samples and the starts of exposure for each of the (groups of) line(s) $R_1, R_2, R_3, R_4 \ldots$ of the image sensor. When the exposure time is very short, i.e. where the frequency of vibration (f) is less than $1/t_{f1}$, where $t_{f1}$ is exposure time for a line, the captured image represents a short moment in time for a given camera orientation. In that case, motion of image features correlates very well with the motion recorded by the IMU sensors during the exposure time for a given (group of) line(s)—each being generally linear or at least monotonic. Thus, by delaying an IMU signal by ½ of the exposure time $t_{f1}$, such an image can corrected according to the IMU sensor data.

However, with the increasing exposure time, $t_{f2} > t_{f1}$, such a correction becomes inappropriate. So referring to FIG. 2(b), a vertical line captured with a rolling shutter where vibration is at a frequency (f) higher than $1/t_{f2}$, without correction, appears as a blurred line 24 within an image. Correction performed according to the IMU sensor data now starts to introduce overcompensation, which in the extreme makes the corrected result look worse, by further distorting the line 24, pulling alternating segments of the line in opposite directions without unblurring the line detail.

So while relatively slower (lower frequency) camera movements can still compensated properly even with a long exposure image where $t_{f2} > t_{f1}$, if the camera is vibrating at frequencies higher than $1/t$, the exposure time for lines of the image, overcompensation is particularly visible.

This becomes a particular problem in drone mounted cameras where the vibration caused by the drone rotors can be of the order of 100 Hz. For images acquired at high light levels, exposure times of as little as 1 ms may be employed and so conventional correction of these images is unaffected by the vibration. However, for images acquired in lower light environments, exposure levels of up to 30 ms or so may be required and these images can be heavily distorted if corrected using conventional techniques.

It is tempting to address the above problem by making correction amplitude a direct function of exposure time, i.e. to damp the degree of correction in proportion to exposure time. However, this does not provide a satisfactory solution, as this affects all vibration frequencies in the same way and so for example, correction of longer-exposed images subject to low frequency shake becomes particularly unsatisfactory.

SUMMARY

According to the present invention, there is provided a method of correcting an image according to claim 1.

Embodiments filter data provided by an inertial measurement unit to provide for stabilization of images with varying exposure times which can be subject to vibration frequencies higher than the readout frequency of an image sensor.

The invention is based on the observation that for longer exposure time images, mechanical vibrations, typically greater than human hand shake or tremor frequencies and for example caused by drone motors, cause oscillating motion blur within acquired images, including images within a video sequence.

Correction of such longer exposure time images which are subject to high frequency vibration using the embodiment of the present invention does not necessarily remove high frequency motion blur from the image, but it prevents further distortion of the image.

The same results cannot be achieved using low-pass filters typically built into gyroscopes within device IMUs. These are meant to prevent any aliasing artefacts caused by sampling and to reduce signal noise. Typically they offer several pre-defined filter settings for applications like inertial navigation or applications which depend on device orientation where the frequency components of a measured signal are relatively low. Those filters are implemented as IIR filters with a phase delay that is uncorrelated with the exposure time and can be different for different signal frequencies.

BRIEF DESCRIPTION OF THE DRAWINGS

An embodiment of the invention will now be described, by way of example, with reference to the accompanying drawings, in which:

FIG. 2($a$) and FIG. 2($b$) illustrate the effect of acquisition device movement during exposure of respective images from a rolling shutter exposure.

DESCRIPTION OF EMBODIMENTS OF THE INVENTION

Figure 1:
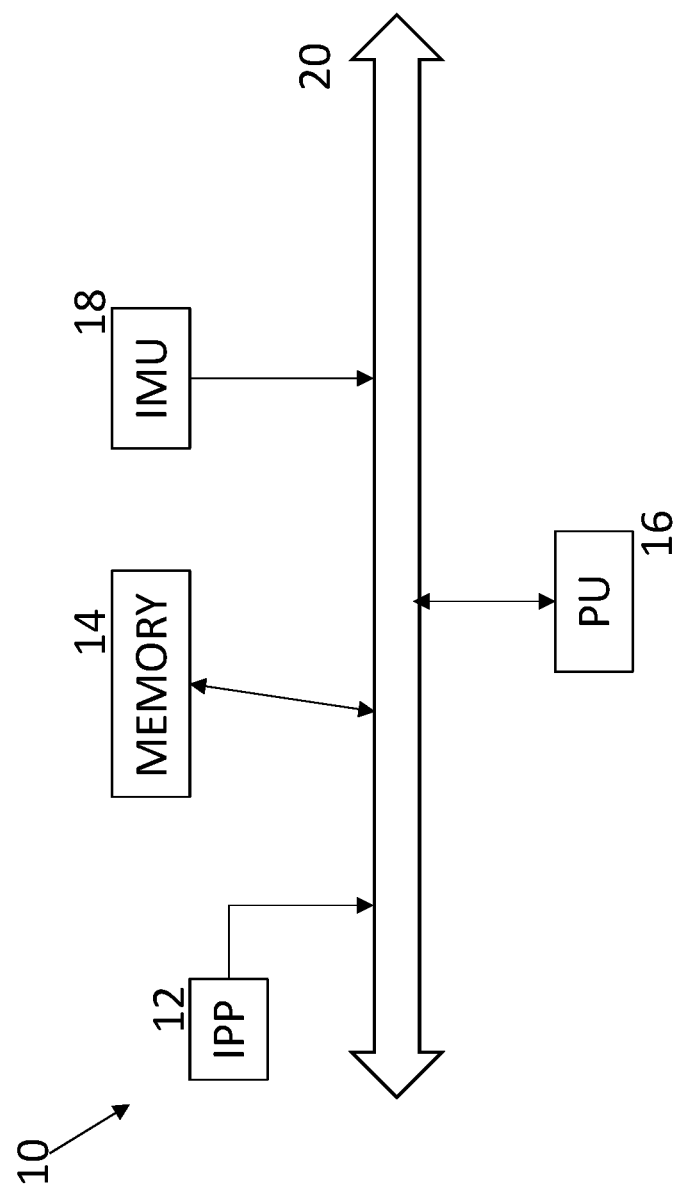
FIG. 1 is a block diagram of an image acquisition device according to an embodiment of the invention.

In embodiments of the present invention, IMU sensor data is integrated over the exposure time of the lines of an acquired image so tending to average the record of device movement. As a result, correction to each line of an image is calculated for average camera orientation during the exposure time of the line. Importantly, the range of the integrator (or the corner frequency of the integrator) is a function of the exposure time of the image.

In one embodiment the IMU sensor data comprises gyroscope samples and the method operates as follows:
1. Successive gyroscope samples $G_n$ are added to a cumulative buffer, where each new element is a sum of the current value $G_n$ and all previous sample values added to the buffer. The cumulative value corresponding to sample $G_n$ is denoted as $C_n$
2. An index to the cumulative buffer is calculated dependent on the gyroscope sampling frequency F and exposure time $t_e$ as follows: idx=F*$t_e$
3. An average gyroscope rate is calculated: $\overline{G}=(C_n-C_{n-idx})/idx$
4. The average rate $\overline{G}$ is used as the numerical integration of camera orientation. It is these filtered values $\overline{G}$ which are used subsequently in place of the trajectory of corresponding original samples $G_n$ for correction of corresponding lines of an image in an otherwise conventional fashion. It will be seen that this mode of filtering does not require any additional corrections and will automatically adapt to changing exposure time.

It will be seen that for short exposure images, idx will be short and so the linear approximation $\overline{G}$ of device movement during exposure time will provide similar values to the original samples G and so will be appropriate for correcting such images. On the other hand, as exposure times increase, the averaging will have the effect of not overcorrecting an image subject to high frequency vibration, but can still provide useful correction for images subjected to human hand shake or tremor.

While the above example has been described in terms of gyroscope samples, the same technique can be applied to sample values from all IMU sensors (gyroscope, accelerometer, magnetometer) in implementations where full sensor fusion is required.

The above approach can be employed whether images are acquired using a rolling shutter technique or not. Where lines of an image are exposed successively, then successive corresponding IMU measurements filtered as above can be employed to correct for device movement during exposure of those lines; whereas for an image where all lines are exposed at the same time, then the same IMU measurements filtered as above are applied to all lines.

The filtered IMU sensor signals described above can be employed in electronic image stabilisation (EIS) schemes such as disclosed in co-filed application Ser. No. 15/048,149 in place of raw sensor signals conventionally employed to mitigate problems caused by high frequency vibration of the camera during image capture.

The invention claimed is:
1. A method of correcting an image obtained by an image acquisition device including:
   obtaining successive measurements, $G_n$, of device movement during exposure of each row of an image;
   selecting an integration range, idx, in proportion to an exposure time, $t_e$, for each row of the image,
   averaging accumulated measurements, $C_n$, of device movement for each row of an image across said integration range to provide successive filtered measurements, $\overline{G}$, of device movement during exposure of each row of an image, and
   correcting said image for device movement using said filtered measurements $\overline{G}$.
2. A method according to claim 1 wherein said integration range, idx, is calculated dependent on a sampling frequency F for said measurements of device movement and said exposure time $t_e$ as follows: idx=F*$t_e$.
3. A method according to claim 1 wherein said averaging comprises calculating said filtered measurements $\overline{G}$ as follows: $\overline{G}=(C_n-C_{n-idx})/idx$ where $C_n$ is an accumulated value corresponding to measurement $G_n$ and $C_{n-idx}$ is an accumulated value corresponding to measurement $G_{n-idx}$ at the start of said integration range.
4. A method according to claim 1 wherein said measurements of device movement comprise any of: gyroscope, accelerometer or magnetometer measurements.
5. A method according to claim 1 wherein said image comprises a still image or an image within a sequence of images.
6. A method according to claim 1 wherein said rows of said image are acquired during successive exposure times, $t_r$, said measurements of device movement corresponding to respective exposure times.

* * * * *